US011241007B2

(12) United States Patent
Burgeson et al.

(10) Patent No.: US 11,241,007 B2
(45) Date of Patent: Feb. 8, 2022

(54) TEMPERATURE-REGULATED SCENT DISPENSER AND METHOD OF USING THEREOF

(71) Applicant: WILDLIFE RESEARCH CENTER, INC., Ramsey, MN (US)

(72) Inventors: Samuel A. Burgeson, Blaine, MN (US); Shawn McKinney, Forest Lake, MN (US)

(73) Assignee: WILDLIFE RESEARCH CENTER, INC., Ramsey, MN (US)

( * ) Notice: Subject to any disclaimer, the term of this patent is extended or adjusted under 35 U.S.C. 154(b) by 637 days.

(21) Appl. No.: 15/446,868

(22) Filed: Mar. 1, 2017

(65) Prior Publication Data
US 2018/0249702 A1 Sep. 6, 2018

(51) Int. Cl.
| | |
|---|---|
| *A01M 31/00* | (2006.01) |
| *B65D 23/00* | (2006.01) |
| *B65D 23/08* | (2006.01) |
| *B65D 1/02* | (2006.01) |
| *B65D 47/06* | (2006.01) |

(52) U.S. Cl.
CPC ......... *A01M 31/008* (2013.01); *B65D 1/0246* (2013.01); *B65D 23/003* (2013.01); *B65D 23/08* (2013.01); *B65D 47/06* (2013.01)

(58) Field of Classification Search
CPC . A01M 31/008; B65D 1/0246; B65D 23/003; B65D 23/08; B65D 47/06
USPC .................................................. 239/37–43
See application file for complete search history.

(56) References Cited

U.S. PATENT DOCUMENTS

| | | | |
|---|---|---|---|
| 3,125,069 A | 3/1964 | Fowler | |
| 3,552,605 A | 1/1971 | Hein | |
| 4,238,108 A | 12/1980 | Muetterties | |
| 4,635,828 A | 1/1987 | Kaufman | |

(Continued)

FOREIGN PATENT DOCUMENTS

WO WO 2011088274 7/2011

OTHER PUBLICATIONS

Tricorbraun plastic bottle, RapidCode 2016531 (details retrieved from http://rapidfind.tricorbraun.com/products/productDetalls.asp?matl=plastic&resultsetID=13455&productID=30841&startindex=1_ on Oct. 8, 2010).

(Continued)

*Primary Examiner* — Christopher S Kim
(74) *Attorney, Agent, or Firm* — Dorsey & Whitney LLP

(57) ABSTRACT

A liquid scent dispenser may include a container, an attachment component, and a cap. The container may define an opening at a first end and an interior portion housing a liquid scent. A first attachment opening defined by the attachment component may be engaged with the container opening. The attachment component may define a second opening and an interior volume housing an amount of air. The cap may be engaged with the second opening and may define at least one scent dispense tube, which may be in fluid communication with the interior container volume. The dispenser may be configured to permit an expansion of air pressure in its interior volume when there is an increase in ambient temperature, so that air displaces a portion of the liquid scent from the dispenser, which passes through the interior volume into the cap and exits the dispenser through a scent dispense tube.

19 Claims, 8 Drawing Sheets

(56) References Cited

U.S. PATENT DOCUMENTS

| | | |
|---|---|---|
| 4,773,177 A | 9/1988 | Gray et al. |
| 4,938,168 A | 7/1990 | Meidell |
| 4,993,568 A | 2/1991 | Morifuji et al. |
| 5,035,340 A | 7/1991 | Timmons |
| 5,060,411 A | 10/1991 | Uhlman |
| 5,060,830 A | 10/1991 | Krall |
| 5,148,949 A | 9/1992 | Luca |
| 5,220,741 A | 6/1993 | Burgeson |
| 5,263,274 A | 11/1993 | Speed |
| 5,279,062 A | 1/1994 | Burgeson |
| 5,361,527 A | 11/1994 | Burgeson |
| 5,429,271 A | 7/1995 | Porter |
| 5,461,814 A | 10/1995 | Reid et al. |
| 5,555,663 A | 9/1996 | Burgeson |
| D379,304 S | 5/1997 | Bova |
| D396,188 S | 7/1998 | Sayers |
| 5,803,315 A | 9/1998 | Kaufman |
| 5,894,961 A | 4/1999 | Kaufman et al. |
| 5,904,272 A * | 5/1999 | Kaufman .............. A47K 5/1202 222/207 |
| 5,971,208 A | 10/1999 | Kennedy |
| D435,896 S | 1/2001 | Burgeson |
| 6,209,252 B1 | 4/2001 | McGough |
| D447,533 S | 9/2001 | Cox |
| 6,589,487 B1 | 7/2003 | Ly et al. |
| 6,592,104 B2 | 7/2003 | Cox |
| 6,708,897 B1 | 3/2004 | Hart |
| D515,685 S | 2/2006 | Ribbing et al. |
| 7,108,199 B1 | 9/2006 | Brown |
| 8,510,984 B2 | 8/2013 | Burgeson |
| D716,432 S | 10/2014 | Viala et al. |
| D727,671 S | 4/2015 | Gamelli |
| D755,629 S | 5/2016 | Marraccini |
| D775,925 S | 1/2017 | Lin |
| D801,830 S | 11/2017 | Zhang et al. |
| 2002/0054273 A1 | 5/2002 | Martin |
| 2005/0189433 A1 | 9/2005 | Burgeson |
| 2005/0189434 A1* | 9/2005 | Burgeson ............ A01M 1/2044 239/44 |
| 2006/0260651 A1 | 11/2006 | Holley, Jr. |
| 2008/0054021 A1 | 3/2008 | Brown et al. |
| 2008/0283537 A1 | 11/2008 | Smith et al. |
| 2009/0320889 A1 | 12/2009 | Holley, Jr. |

OTHER PUBLICATIONS

Tricorbraun bottle closure, RapidCode 3002611 (details retrieved from http://rapidfind.tricorbraun.com/Rroducts/RroductDetalis.asp?matl=closures&resultsetID=13460&productID=9989&startindex=61_ on Oct. 8, 2010).

Key-Wick®, Wildlife Research Center, Inc., downloaded from http://wildlife.com/Hunting-Scent-Dispenser-Product_Detaiis.php?Key-Wick-2 Sep. 27, 2013.

Continuous Wicking System™, Wildlife Research Center, Inc. downloaded from http://wildlife.com/Hunting-Scent-Dispenser-Product_Details.php?Continuous-Wicking-System-10 Sep. 27, 2013.

Pro-Wick®, Wildlife Research Center, Inc., downloaded from http://wildlife.com/Hunting-Scent-Dispenser-Product_Details.php?Pro-Wick-4 Sep. 27, 2013.

Quik-Wiks®, Wildlife Research Center, Inc., downloaded from http://wildlife.com/Hunting-Scent-Dispenser-Product_Details.php?Quik-Wiks-3 Sep. 27, 2013.

Wildlife 381 Magnum ScrapeDripper Scent Dispenser, Camouflage by Wildlife Research, downloaded from https://www.amazon.com/Wildlife-381-Scrape-Dripper-Dispenser-Camouflage/dp/B002PUS6R2 on Sep. 29, 2016.

* cited by examiner

TEMPERATURE-REGULATED SCENT DISPENSER AND METHOD OF USING THEREOF

FIELD OF THE INVENTION

The present disclosure includes apparatuses and methods for a liquid scent dispenser. More particularly, the present disclosure relates to apparatuses and methods for a temperature-regulated, pressure-activated liquid scent dispenser. The liquid scent dispenser may include an attachment component configured to retain a volume of air, a container configured to hold a volume of liquid, and a cap configured to release a portion of the liquid as pressure increases in the interior of the dispenser.

BACKGROUND

The use of animal attractant scents by outdoor enthusiasts, including hunters and photographers, to increase their chances of getting close to animals is known. In particular, these scents can be used in ways that take advantage of the mating processes of certain species. For example, in the case of the white-tail deer, it is known that the buck will prepare a "scrape" to attract a doe. The scrape is prepared by the buck as he scrapes the ground with his hooves at a particular spot and deposits some urine thereon. This action can serve to attract a doe, who may then periodically deposit scent, including urine, on the scrape, which may at times indicate her receptiveness for mating. In addition, other bucks also may visit the scrape, for territorial or other reasons. The buck will, in this manner, be alerted to the presence of the doe and/or other bucks and will tend to spend more time in the location of his scrape. Thus, outdoor enthusiasts will prepare an artificial, or mock, scrape or locate a natural scrape, in attempts to attract a deer. This is done by finding a scrape, or preparing a mock scrape by scraping the ground in a manner similar to that of a buck, and then depositing a commercially available scent thereon, which may signal to the buck the presence of a doe at a certain stage of her estrous cycle. Mock scrapes are commonly prepared to imitate natural scrapes and achieve the same purpose.

Examples of commercially available scents that may be sold with or without a device for dispensing the scents include but are not limited to doe urine, doe estrous secretions, and buck urine. The commercially available scents may also be artificial, man-made, or made with other ingredients.

Devices for depositing such scents are known, and generally consist of a bottle or other container for holding the scent and a mechanism for regulating the rate that the scent drips therefrom onto the scape. Such devices are typically suspended from a branch above the scrape and provide for a continuous release of the scent. However, such a continuous flow is not generally desirable and may be disadvantageous, as attractant scents are relatively expensive, and release is not necessary during the night or during periods of rain when the scent can be washed away. Generally, it may be better to dispense a scent only during the daytime hours. This may increase the likelihood the animal will visit the location of the dispenser during daytime hours. In some cases, such as during rut, bucks may visit locations both during the night and day hours. A dispenser that conditions the buck to come around the daytime hours may help change the buck's pattern. Continuous manual opening and closing of the valve, as would be done with the prior art devices, is not a good solution to this problem as scent deposition can take place over a number of days and would therefore be tedious. Similarly, continuous opening and closing of the valve is not desirable due to the greater possibility of leaving unwanted human odors around the scrape. Also, the valves of these devices, when set to provide for a very low flow rate, can become blocked and completely stop the flow of scent.

Yet other scent dispensing devices, such as those described in U.S. Pat. Nos. 5,220,741, 5,279,062, 5,361,527, 8,510,984, and 8,739,455, take advantage of the relative change in temperature that generally occurs between day and night. A liquid scent, in one embodiment, fills a reservoir. As temperature increases to a great enough level, the volume of liquid scent in the reservoir rises high enough to reach an opening at the top of the reservoir, where the liquid scent drips from the dispensing device. In another described embodiment, the reservoir is a tube formed into a loop whereby it extends through an arc of 360 degrees. As such, the temperature must increase to a level wherein the liquid scent will be forced through the arc and drip out an opening at the end of the reservoir tube. Certain of these devices require that the user only fill the reservoir to a certain level, so as to leave enough air in the container for the device to work. If the user fills the reservoir, the device may lack sufficient trapped air to work. Additional embodiments of temperature-regulated dispensers include a container for holding a liquid scent and a cap secured thereto. The cap defines a scent-release orifice and an internal release structure configured to equalize the air pressure within the container with the air pressure outside of the dispenser.

There is a need in the art for apparatuses and methods for a liquid scent dispenser which overcomes the deficiencies and limitations of the prior art. Particularly, there is a need in the art for apparatuses and methods for a temperature regulated, pressure activated scent dispenser equipped to hold and dispense greater volumes of liquid scent than preexisting dispensers. A need also exists for a temperature regulated, pressure activated scent dispenser that can be calibrated to achieve a desired output of liquid scent. There is a further need in the art for apparatuses and methods for a temperature regulated, pressure activated scent dispenser with interchangeable components designed to increase the number of scent-dispensing options available to a user.

SUMMARY

In some embodiments, a liquid scent dispenser may include a container defining an interior portion housing a liquid scent. The container may also define an opening at a first end of the container. The liquid scent dispenser may also include an attachment component engaged, at a first attachment opening at a first end of the attachment component, with the container opening. The attachment component may further define a second attachment opening at a second end of the attachment component and an interior volume housing an amount of air. The liquid scent dispenser may further include a cap engaged with the second attachment opening, and the cap may define at least one scent dispense tube, which may be in fluid communication with the interior container volume. In some examples, the dispenser may be configured to permit an expansion of air pressure in its interior volume when there is an increase in ambient temperature above an initial ambient temperature, so that at least a portion of the amount of air displaces a portion of the liquid scent from the dispenser. The portion of the liquid scent may pass through the interior volume into the cap and exit the dispenser through the at least one scent dispense tube.

In various implementations, the liquid scent dispenser may include a cover component enclosing the container. The cover component may include a hanging means, which may include an aperture configured to receive an object. In some examples, the hanging means may include a rope.

In some embodiments, the liquid scent may include one or more scents that may precipitate a territorial or mating attraction of deer before, during or after rut. The at least one scent dispense tube may be vertically oriented and may define an internal entrance at a first end and a scent release orifice at a second end. The threshold volume may be further defined by an interstitial space between the cap and the attachment component, such that when the liquid scent fills the interstitial space, the liquid scent overflows into the at least one scent dispense tube. In some examples, the at least one scent dispense tube may include a plurality of scent dispense tubes, each having an equal height.

In some embodiments, the attachment component may include an outlet passageway through which the liquid scent flows before entering the cap. The attachment component may be generally cylindrical. In some examples, the attachment component may have a height of about 2 to about 3 inches, and/or a width of about 0.5 to about 1.5 inches. The interior volume of the attachment may be about 0.5 to about 1.5 in$^3$.

In additional examples, a liquid scent dispenser may include a liquid scent; a container having an interior portion configured to hold the liquid scent; a cap defining at least one scent dispense tube which is in fluid communication with the interior portion of the container; and a removable attachment component coupled between the container and the cap, where the removable attachment component has an interior volume configured to hold an amount of air. In some implementations, the dispenser may be configured to permit an increase of air volume in the interior volume when there is an increase in ambient air temperature above an initial ambient temperature, so that the air displaces at least a portion of the liquid scent from the dispenser, where the liquid scent flows through the interior volume into the cap and exits the dispenser through the at least one scent dispense tube.

In some examples, the portion of the liquid scent may exit the dispenser through at least one scent dispense tube upon overflowing from an interstitial space into the scent dispense tube. The interstitial space may be defined by the cap and the attachment component. In some embodiments, the at least one scent dispense tube may include a plurality of scent dispense tubes, each tube having an equal height. In some embodiments, the removable attachment component may have an adjustable internal volume. In some examples, the container may be configured to be completely filled with liquid scent by a user. The attachment component may be a cylindrical tube having a height of about 2 to about 3 inches and a diameter of about 0.5 to about 1.5 inches.

BRIEF DESCRIPTION OF THE DRAWINGS

While the specification concludes with claims particularly pointing out and distinctly claiming the subject matter that is regarded as forming the various embodiments of the present invention, it is believed that the invention will be better understood from the following description taken in conjunction with the accompanying Figures, in which:

DETAILED DESCRIPTION

The present disclosure includes novel and advantageous apparatuses and methods for a liquid scent dispenser. More particularly, apparatuses and methods for a temperature regulated, pressure activated liquid scent dispenser having a container coupled with an attachment component and a cap are described. Air contained within the attachment component may expand as ambient temperature rises, causing the air pressure within the attachment component to increase. Pressurized air in the attachment component may displace a portion of liquid scent housed in the container, causing it to exit the container and pass through the attachment component and into the cap. Internal tubes defined by the cap may be configured to prevent the liquid scent from escaping the cap until a threshold volume of liquid scent enters the cap. Applications of such devices may include, but are not limited to, dispensing animal attractant or repellent in the form of a liquid scent, and in some embodiments, dispensing animal attractant over an artificial or natural scrape. A liquid scent dispenser of the present disclosure may be well suited for use at both natural and mock scrapes. Some examples of scents may include, but are not limited to, doe urine, doe estrous secretions, and buck urine. The scents may be artificial and/or man-made. Similarly, the scents may be used during any period of time that is suitable and is not limited to mating season of any particular animal.

Figure 1:
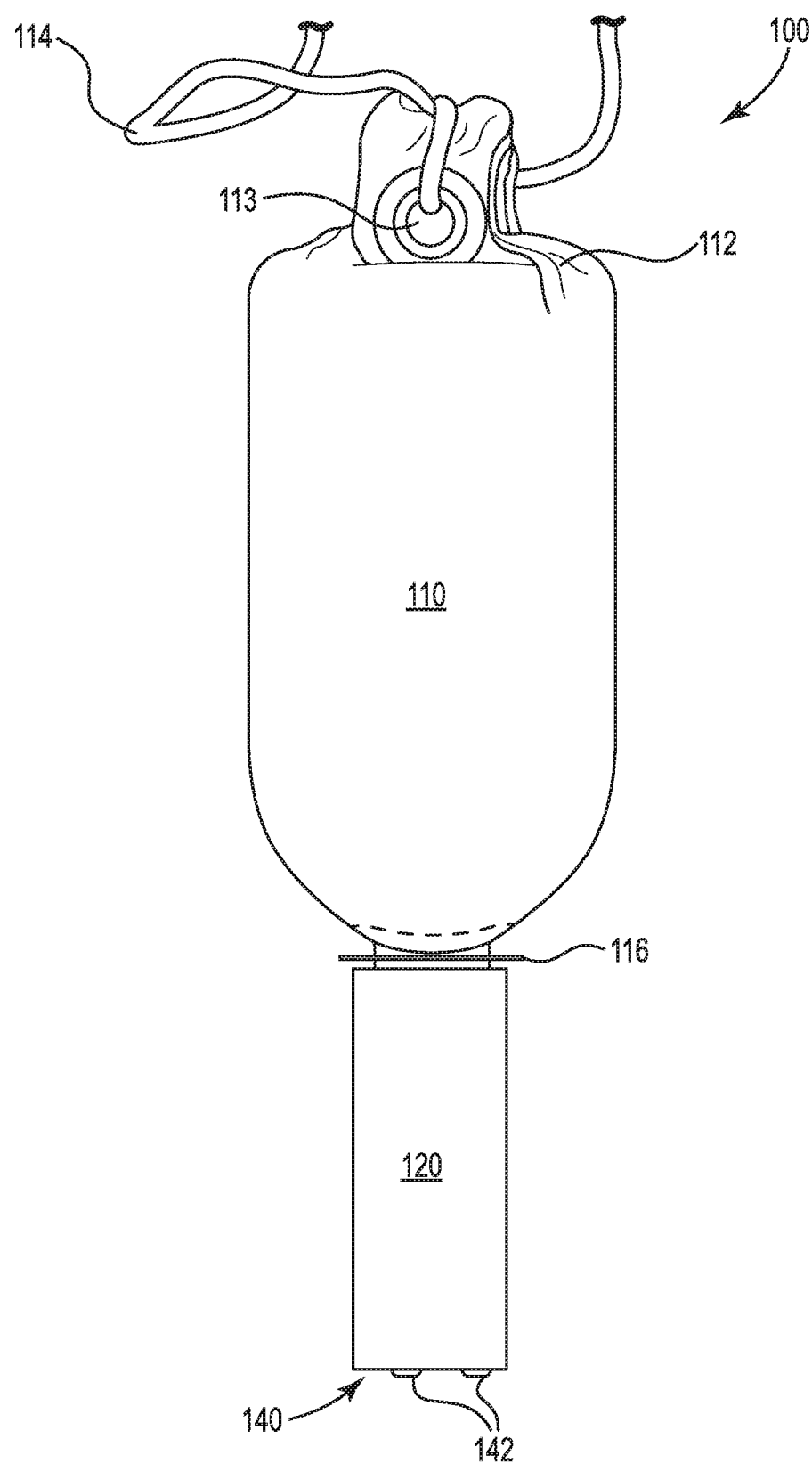
FIG. 1 is a front view of a liquid scent dispenser in accordance with one embodiment of the present disclosure.

With reference to FIG. 1, an embodiment of a liquid scent dispenser is generally illustrated as 100. The liquid scent dispenser 100 may include a container 110 for holding a liquid scent. The liquid scent dispenser 100 may also include an attachment component 120 and a cap 140 coupled thereto. As will be described further below, it is recognized that not all components listed above are required for the liquid scent dispenser 100, and some of the components may be eliminated while other components may be added.

The container 110 may be made of a generally rigid material, such that pressure may increase in the container 110 without flexing the container 110 too extensively. In some examples, the container 110 may be manufactured from plastic, metal, metal alloy, composite, glass, etc., or any combination thereof. In further embodiments, the container material may be durable and inexpensive, such as embodiments made of plastic. In yet further embodiments, the container material may be selected such that the material chosen does not interfere with the properties of a liquid contained therein, such as the scent of the liquid. Alternatively, the container's stiffness may range from rigid to flexible, as necessary for a given application.

The container 110 may hold a liquid, such as a liquid scent. In one embodiment, the liquid may be an animal attractant, including but not limited to an animal sexual attractant. For example, an animal sexual attractant used may include deer urine or a particular scent, produced by a doe when in heat. In alternative embodiments, other liquids may be used, such as but not limited to, animal and/or pest repellents, or scents that provide agreeable or disagreeable odors to humans, masking scents, or any other desired material. In yet further embodiments, the contents of the container 110 may include gels or thick liquids. The liquid may be synthetic, natural, a synthetically produced natural substance, a mixture of these, etc.

Before releasing any liquid from the liquid scent dispenser 100, the dispenser 100 may include an initial amount of liquid. In some examples, the dispenser 100 may be fillable/refillable with a liquid. In various embodiments, the container 110 may be completely filled with a liquid, or only partially filled with a liquid. The volume and/or shape of the container 110 may vary in different embodiments. For example, the container 110 may be approximately cylindrical, circular, or any other shape capable of retaining a liquid and withstanding an internal pressure.

As further shown in FIG. 1, the container 110 may be enclosed within a cover component 112. In some examples, the cover component 112 may comprise a cloth or other fabric or material, which may be weather resistant and/or stretchable. The cover component 112 may be configured to be at least relatively unnoticeable by deer. For instance, the cover component 112 may include a camouflage design. In various embodiments, the design of the cover component 112 may be clear, colored, patterned with a design, including a label, or any combination thereof. In some embodiments, the cover component 112 may be brightly colored, for example blaze orange. In such cases, the liquid scent dispenser 100 may be very visible to humans and may be used as a trail marker, yardage marker, etc. In a further embodiment, a clear strip may be included on the container 110 and the cover component 112 such that the level of liquid in the container 110 may be indicated. In various embodiments, the cover component 112 may be absent from the liquid scent dispenser 100. In such embodiments, the body of the container 110 itself may be camouflaged or colored to either blend in with the surrounding environment and/or stand out to hunters. In some examples, the cover component 112 may be removable and interchangeable with other cover components having different external designs, such that users may select which design is appropriate for a given application of the dispenser 100.

In some embodiments, the dispenser 100 may include hanging means 113 for suspending the dispenser. The hanging means 113 may be integrated within the container 110, defined by the cover component 112, and/or attachable thereto. In the embodiment shown, the hanging means 113 include an aperture or hole defined by the cover component 112 near the top of the dispenser 100, opposite the attachment component 120. The hole 113 may be configured to receive various objects, e.g., tree branches, having a thickness less than the diameter of the hole. To prevent the hole from wearing, it may include a rigid circumferential lining, e.g., stitching or a ring. The circumferential lining may be comprised of various rigid and preferably weather-resistant materials, such as one or more metals and/or hard plastics, for example. In some implementations, such as that shown in FIG. 1, a string or rope 114 or other component may be removably attached, e.g., tied, to the hole 113, thereby increasing the number of ways the dispenser 100 may be suspended from an object. In additional examples, the hanging means 113 may include a hook, a clamp, a wire, a clip, a spike or stake, a snap, a velcro segment, a screw or any other means for attachment including tape, adhesives, etc.

Near the bottom of the container 110, opposite the hanging means 113, a horizontally oriented partition 116 may be included. The partition 116 may comprise a thin plastic disc configured to prevent the cover component 112 from sliding down near the attachment component 120. Securing the cover component 112 above the attachment component 120 may prevent the cover component 112 from interfering with the act of manually coupling the attachment component 120 with the container 110. In embodiments, the partition 116 may be removable. In some examples, the partition 116 may be configured to mate with a threaded portion defined by the container 110, such that the partition is rotatably coupled thereto. In additional embodiments, the partition may be eliminated from the dispenser 100.

From the front view of the liquid scent dispenser 100 illustrated in FIG. 1, the majority of the cap 140 is not visible. In particular, only the protruding dispense nodules 142 defined by the cap 140 are visible, as the rest of the cap 140 is inserted within a receiving space defined by the attachment component 120. As further described below, each dispense nodule 142 may define a tube through which a liquid scent may exit, e.g., drip, from the liquid scent dispenser 100.

Figure 2:
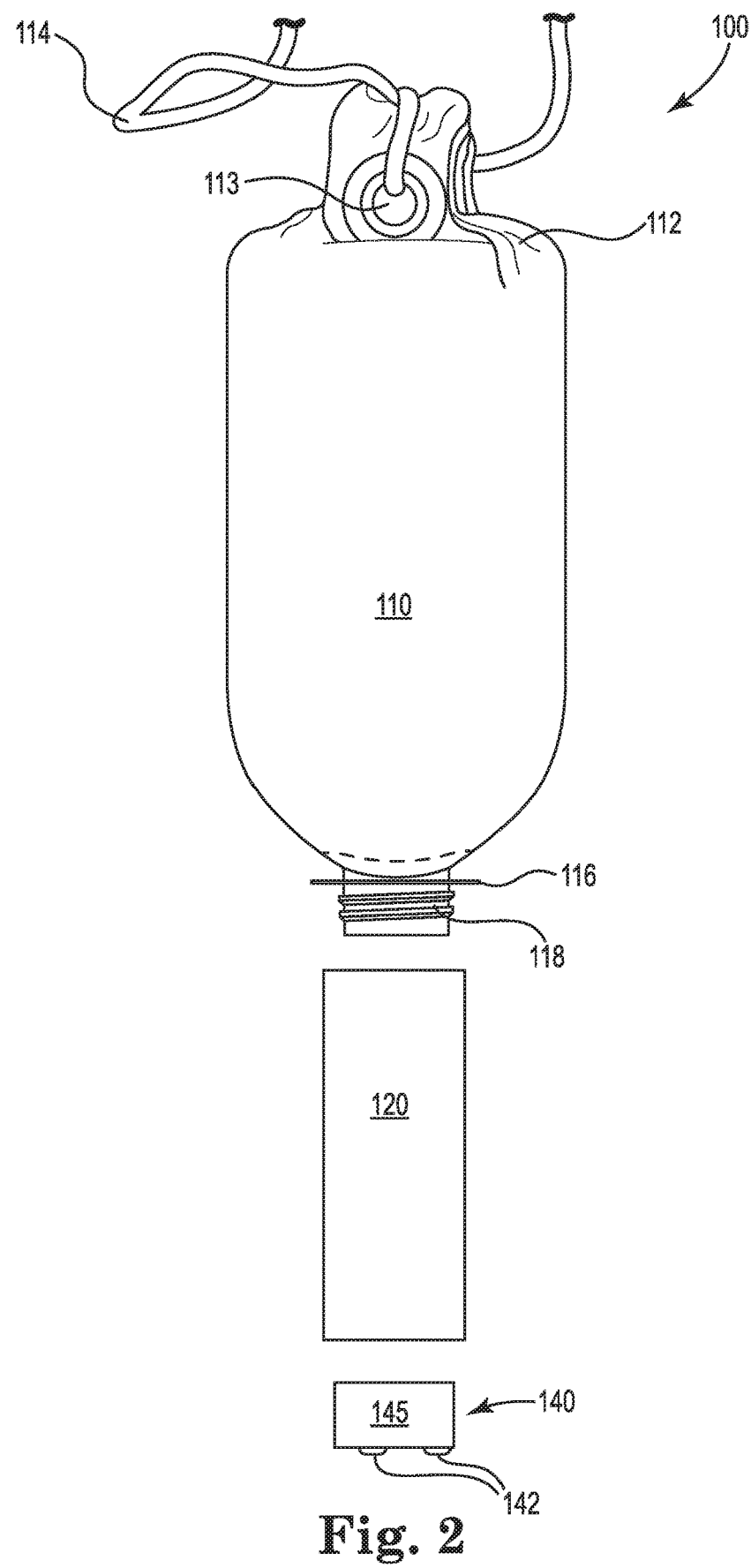
FIG. 2 is an unassembled front view of the liquid scent dispenser shown in FIG. 1 in accordance with an embodiment of the present disclosure.

FIG. 2 illustrates the liquid scent dispenser 100 in an unassembled view. As shown, the container 110 may define an opening 118 at a first end. Prior to assembly, for example when filling or refilling the container 110, a liquid may be added through the opening 118, for instance by pouring or pumping the liquid therein. After assembly, the liquid may exit the container 110 through the same opening 118, subsequently entering the attachment component 120 through a first opening defined by the attachment component. As further shown in FIG. 2, the opening 118 may include threads which may threadably engage complementary threads included in an opening defined by the attachment component 120. In the particular embodiment shown, the threads are illustrated on the external surface of the opening 118. In other examples, the opening 118 may include internal threads, and the attachment component 120 may include complementary external threads. In additional or alternative implementations, the attachment component 120 may be engageable with the container 110 via other mechanisms, e.g., snap fit, friction fit, magnetic coupling, etc. Additional examples may include a second opening in the container 110, such that liquid may be added to the container 110 via one opening, and released from the container 110 at a second opening, e.g., opening 118. Containers with multiple openings may be desired to refill the container 110 without repeatedly disassembling and reassembling the dispenser 100.

In this unassembled arrangement, the cap 140 is visible, specifically the circumferential wall 145 that defines the perimeter of the cap 140, along with two dispense nodules 142 protruding below it. As shown, the diameter of the cap 140 may be less than the diameter of a second opening defined by the attachment component 120, such that the cap 140 may be inserted into the second opening defined by the attachment component 120. In some examples, the cap 140 may be urged into the attachment component 120 and secured therein by friction fit. To prevent leaks, the cap 140 may be tightly secured within the attachment component 120 such that the cap may be moderately difficult to remove in some embodiments. In other examples, the cap 140 may be wider in diameter than the attachment component 120, such that a lower portion of the attachment component 120 may fit within the cap 140.

In other embodiments, the dispenser 100 may be manufactured as a unitary piece, such that the container 110, attachment component 120, and cap 140 are all integrally formed as a single unit. In some examples, the dispenser 100 may be a single-use, disposable device, while in other embodiments the dispenser 100 may be reusable. In other embodiments, the container 110 may be one piece, and the attachment component 120 and cap 140 may be formed as a separate integral piece.

Figure 3:
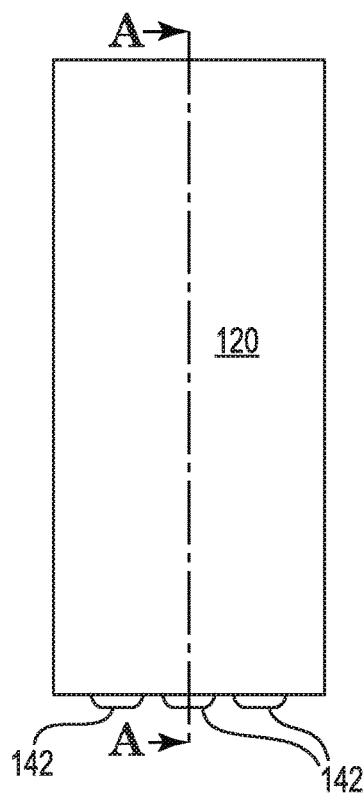
FIG. 3 is a front view of an attachment component of the liquid scent dispenser shown in FIGS. 1 and 2 in accordance with an embodiment of the present disclosure.

FIG. 3 is a side view of the attachment component 120 with the cap 140 coupled thereto, Dispense nodules 142 protruding beneath the attachment component 120 are again visible. In the particular orientation shown, all three dispense nodules 142 included in this embodiment are visible. In various examples, the distance by which the dispense nodules 142 protrude from the bottom of the attachment component 120 when the cap 140 is inserted therein may vary. By protruding beyond the bottom surface of the cap 140, the nodules 142 may reduce the adhesion between the liquid scent and the cap 140 as the liquid scent is released from a release orifice defined by each nodule 142.

Figure 4:
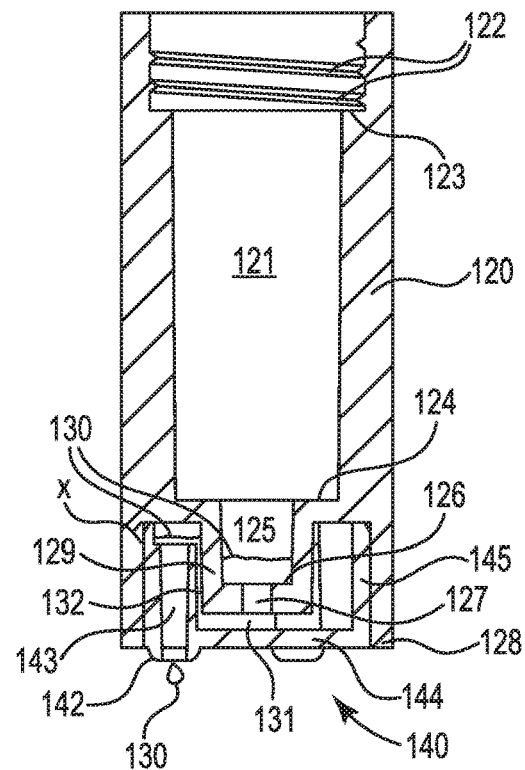
FIG. 4 is a cross-sectional view of the attachment component and cap of FIG. 3 taken along line A-A in accordance with an embodiment of the present disclosure.

FIG. 4 is a cross-sectional side view of the attachment component 120 and cap 140 of FIG. 3, taken along line A-A. As shown, the attachment component 120 may define an internally protruding, circumferential stopper 123 configured to mate with the opening 118 of the container 110 upon threadably engaging the opening 118 with the internal threads 122 defined by the attachment component 120. The attachment component 120 also defines an interior volume 121 and an internally protruding, circumferential edge portion 124. The interior volume 121 is connected to a smaller recess 125, which leads to an outlet passageway 127, such that the interior volume 121, the recess 125, and the outlet passageway 127 are all fluidly connected. A second internally protruding, circumferential edge portion 126 defines the difference in diameter between the recess 125 and the narrower outlet passageway 127. As further shown, the attachment component 120 is coupled with the cap 140. The attachment component 120 has a hollow recess that corresponds to the outer shape of the cap 140, so that the cap 140 may be pressed into (so that it snugly fits within) the open end of the attachment component 120. Specifically, cap receiving space 131 is defined between an outer circumferential portion 128 and an inner circumferential portion 129 of the attachment component 120. Accordingly, the cap receiving space 131 may be shaped as an empty ring. The inner circumferential portion 129 further defines the outlet passageway 127.

In addition to the dispense nodules 142, the cap 140 includes a cap floor 144 and the vertical, circumferential wall 145. Above each dispense nodule 142, within the circumferential wall 145, the cap 140 further defines a dispense tube 143 or passageway. As shown, the circumferential wall 145 of the cap 140 may have a greater height than the dispense tube 143, such that when the cap 140 is fully inserted into the cap receiving space 131, an interstitial space 132 remains between the attachment component 120 and the cap 140. The portion of the circumferential wall 145 extending above the uppermost point of the dispense tube 143 is denoted with an x. The interstitial space 132 extends horizontally below the inner circumferential portion 129 and vertically between the inner circumferential portion 129 and the circumferential wall 145. For purposes of illustration, a liquid 130 is represented in the recess 125, the interstitial space 132, and in droplet form leaving the dispense tube 143.

To couple the attachment component 120 with the cap 140 in one embodiment, the cap 140 may be pressed into the cap receiving space 131 defined by the attachment component 120, where the cap 140 may remain secured by friction. In other embodiments, the cap 140 and the cap receiving space 131 may include complementary threads such that the two components may also be threadably engageable with each other. Other coupling means, e.g., snap fit, may also be utilized. In FIG. 4, the cap 140 and the attachment component 120 are shown as separate components, but in other examples, the two components may be integrally formed with each other. In one example, the cap 140 and the attachment component 120 may comprise a single, unitary piece, and the container 110 may be a separate component that may be coupled with the attachment component 120 and the cap 140.

In operation, the attachment component 120 may contain an amount of air within the interior volume 121, the recess 125, and/or, in some examples, the outlet passageway 127. The interior volume 121 may provide the primary air-retention space. As a result, the container 110 may be filled entirely with liquid in some examples. After filling the container 110 (completely, if desired, unlike in prior art pressure-activated devices), the user will invert the liquid scent dispenser 100, thus allowing liquid to flow into the interior volume 121 of the attachment component 120, with the air that formerly was in the interior volume 121 of the attachment component 120 flowing upward into the container 110. The dispenser 100 operates through the expansion of the air that is in the container 110. As ambient temperature increases, the temperature of the air in the dispenser 100 also increases. As it does so, it expands, and this pressurized air causes at least a portion of the liquid in the container 110 and attachment component 120 to be displaced. The displaced liquid passes downward through the recess 125, and into the outlet passageway 127, proceeding to enter the interstitial space 132 defined between the cap 140 and the attachment component 120. As the interstitial space 132 becomes filled with liquid, the liquid overflows into the dispense tube 143, which releases, e.g., in a dripping fashion, the liquid from the dispenser 100, so that it drips onto the scrape over which the liquid scent dispenser 100 is positioned. More particularly, each dispense tube 143 may define an internal entrance at one end, e.g., the top end, and a scent release orifice at a second end, e.g., the bottom end. The height of the internal entrance at least partially defines the volume of liquid that must enter the interstitial space 132 before the liquid is released from the dispenser 100 because the level of the liquid in the cap 140 must rise to at least that height before flowing over the top end of, and thereby entering, the dispense tube 143. Accordingly, the interstitial space 132 surrounding each dispense tube 143 serves as a buffer preventing the immediate release of liquid from the dispenser 100. The liquid 130 shown in FIG. 4 has filled the interstitial space 132 and risen to a level above the height of the dispense tube 143, thus allowing its release from the dispenser 100. As the temperature of the volume of air in the dispenser 100 continues to increase, the air in the dispenser 100 continues to expand and the dispensing of liquid continues to occur.

When the ambient temperature decreases, such as when night falls, the temperature of the air in the dispenser 100 will decrease, causing that air to contract. That contraction results in air from outside the dispenser 100 entering the attachment component 120 through the dispense tubes 143. That is, as the temperature decreases, it causes a negative pressure such that air from outside the dispenser 100 may be sucked into the attachment component 120 through the dispense tubes 143. As this happens, scent is not being dispensed. As the air temperature increases again the next morning, the air within the liquid scent dispenser 100 will again increase in temperature, and the process described above will repeat, with more liquid being dispensed from the liquid scent dispenser 100.

In some embodiments, the number and configuration of dispense tubes 143 may vary. Any desired number of dispense tubes 143, from one to two to three to four to five or more, may be included in the cap 140. Having more tubes 143 increases in the rate of liquid dispensing. Each tube 143 may have an equal height, such that liquid may be dispensed through each tube 143 simultaneously. In some examples, one or more of a plurality of dispense tubes 143 may have a different height, such that liquid may be released from tubes having shorter heights before the taller tubes. Tubes having different heights may further control the amount of liquid released from the dispenser 100, such that smaller increases in ambient temperature may suffice to trigger scent release from one dispense tube 143, but greater temperature increases may be necessary to release liquid from each dispense tube 143 included in the cap 140. The shape of each dispense tube 143 may also vary. For instance, the dispense tube 143 depicted in FIG. 4 is straight and vertically oriented. In other embodiments, one or more dispense tubes may be circuitous, spiraling, or maze-like, defining one or more corners or turns. In one embodiment, the cap may define a single dispense tube that contains two or more corners or changes in direction, thereby increasing the distance a liquid needs to travel through the tube before exiting the dispenser 100. In additional embodiments, one or more dispense tubes may be defined within the attachment component 120. According to such embodiments, the cap 140 may be eliminated from the dispenser 100, and the dispense tube(s) may simply extend the outlet passageway 127 into an elongated passageway that terminates in a scent release orifice.

In additional embodiments, the cap 140 may lack dispense tubes 143. Some of such embodiments may instead include an angled cap floor 144. An angled cap floor may define a lowest point at or near the middle of the cap 140, and may slant upwardly therefrom toward the circumferential wall 145, thus forming an inclined surface having a maximum height proximal to the wall 145. Within the cap 140 and adjacent to the wall 145, the angled cap floor may drop, thereby forming a circumferential moat. The bottom of the moat may define one or more openings, e.g., holes or slits, through which a liquid scent may exit the dispenser 100. In operation, a liquid may only exit the dispenser by flowing over the maximum height of the angled cap floor. Additional embodiments may include an elevated circumferential shelf within the cap 140. Examples may include one or more openings within the elevated circumferential shelf through which a liquid may exit the cap 140.

The amount of pressure required to cause the liquid to be released, and thus the amount of temperature increase, may also be determined by the configuration of the cap 140, e.g., the size and shape of the dispense tubes 143, as well as the attachment component 120. Multiple variants of the attachment component 120, the cap 140, the dispense tubes 143 and/or other scent release structures may be used to create different liquid scent dispensers that vary in the amount, rate and/or fashion that the liquid is released. In some embodiments, as the volume of liquid decreases in the container 110, the amount of liquid released for the same temperature swing may increase. That is, as the proportionate amount of air in the container 110 increases, the frequency of dispensing and/or the amount of liquid dispensed may also increase. Thus, a larger bottle containing the same volume of liquid as a smaller bottle may dispense the liquid more quickly. Similarly, the color of the liquid scent dispenser 100 may be altered to increase the frequency and/or the amount of liquid released from the container 110. For instance, a dark colored attachment component 120 may heat up faster and/or to a higher temperature than other attachment components.

In addition or alternatively, a liquid scent dispenser 100 may be equipped with a temperature-regulating device configured to control the release of liquid from the dispenser. The device may be electronic and remotely controlled. A heating element, e.g., a coil, and/or a cooling element, e.g., a fan, may be included in the device and activated at times selectable by a user. Such a device may enable a user to dispense liquid attractants during periods of time when the scent might not otherwise be released, for example when the temperature is not increasing above a threshold. In some examples, a temperature-regulating device may be switched between a manual mode, an automatic mode, and/or a natural mode. In the manual mode, a user may control when the liquid is dispensed from the dispenser by selectively activating a temperature-regulating device coupled therewith. In an automatic mode, a user may program the dispenser to release liquid at regular intervals, e.g., daily. In the natural mode, the dispenser may operate as described above, releasing a liquid only in response to natural temperature variations.

In a further embodiment, a chamber, either separate from the container 110 or contained within the container 110, may be provided for maintaining the release of a constant volume of scent upon an appropriate amount of air pressure increase. For example, the chamber may be sized such that a predetermined amount of liquid will be released upon reaching a predetermined pressure increase. The size of the chamber may remain constant, and the amount of liquid in the chamber after each liquid scent release may be automatically refilled to a constant initial amount from the supply of liquid scent in the container 110. Alternatively, the container 110 may include a control valve for controlling or setting the amount of scent that will be released each time the attachment component 120 and the container 110 reach the threshold pressure.

Figure 5:
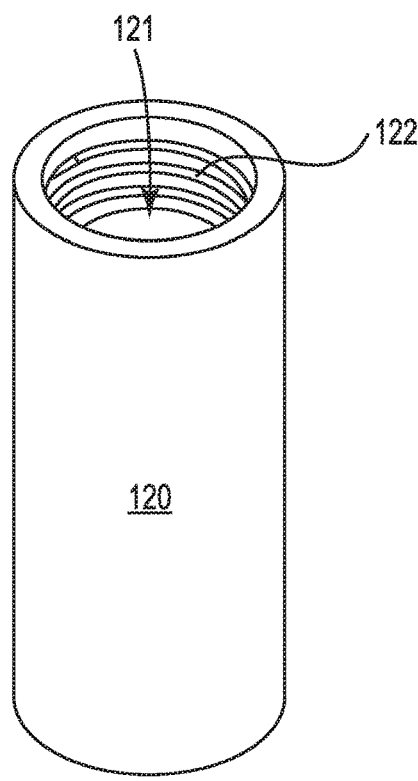
FIG. 5 is a perspective view of the attachment component of FIG. 3 in accordance with an embodiment of the present disclosure.

FIG. 5 is a perspective view of the attachment component 120, showing the internal threads 122 and a portion of the interior volume 121. As shown, the attachment component 120 may be of unitary construction and may be elongate and cylindrical in some examples. In embodiments, the attachment component 120 may be differently shaped, e.g., rectangular, elliptical, cone-like, pyramidal, or square, or any other desired exterior shape, and may include one or more sub-components. The size of the attachment component 120 may also vary. By varying the size of the attachment component 120, the temperature and/or rate at which liquid is released from the dispenser 100 may be adjusted. For example, the larger the attachment component 120, the more air that will enter the container 110 when the attachment component 120 is secured, thus leading to more air expanding and thus more pushing of the liquid and more rapid scent dispensing. More air pressure in the container 110 may cause more liquid scent to be released therefrom. Accordingly, a larger attachment component 120 may be appropriate for releasing liquid from the dispenser 100 at a faster rate, while a smaller attachment component 120 may be appropriate for releasing liquid from the dispenser 100 at a slower rate. Multiple differently-sized attachment components 120 may be provided so that a user may select the temperature at which liquid scent may be released, the amount of liquid scent that is released, and/or the rate at which liquid scent is released from a dispenser 100 by choosing a particularly-sized attachment component 120. In some examples, the height of the attachment component 120 may range from about 0.5 to about 5.0 inches, about 1.0 to about 4.5 inches, about 1.5 to about 4.0 inches, about 2.0 to about 3.5 inches, about 2.5 to about 3.0 inches, about 2.6 to about 2.9 inches, or about 2.7 to about 2.8 inches. The width or diameter of the attachment component 120 may also vary. In various embodiments, a cylindrical attachment component 120 may have a diameter ranging from about 0.5 to about 2.5 inches, about 0.75 to about 2.0 inches, about 1.0 to about 1.5 inches, about 1.1 to about 1.3 inches, or about 1.25 inches. Attachment components having different dimensions may also have different interior volumes. In some examples, the interior volume 121 may range from about 0.5 to about 1.5 $in^3$, about 0.6 to about 1.4 $in^3$, about 0.7 to about 1.3 $in^3$, about 0.8 to about 1.2 $in^3$, about 0.9 to about 1.1 $in^3$, or about 1.0 $in^3$. The total interior volume of the dispenser would be the sum of the interior volumes of the container 110, attachment 120, and cap 145, and may be any desired volume, including about 5 to about 20 $in^3$, or about 10 to about 15 $in^3$, or any other desired volume.

Figure 6:
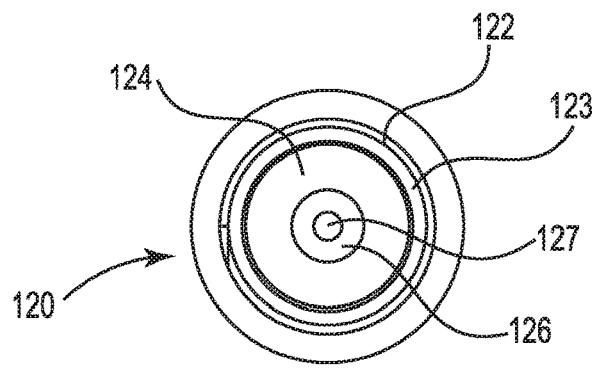
FIG. 6 is a top view of the attachment component of FIG. 3 in accordance with an embodiment of the present disclosure.

FIG. 6 is a top view of an embodiment of the attachment component 120. Several features of the attachment component 120 are visible in this view. In particular, the threads 122, the circumferential stop 123, the circumferential edge portion 124, the second circumferential edge portion 126, and the outlet passageway 127 are all visible from this view.

Together, the features shown in FIG. 6 define the interior volume 121, the recess 125, and the outlet passageway 127, each of which are radially symmetrical. By having progressively smaller diameters, the recess 125 and the outlet passageway 127 may effectively funnel a liquid scent, in stepwise fashion, from the interior volume 121 into the interstitial space 132. The rate of liquid released from the dispenser 100 may be controlled, in part, by the size of the recess 125 and the outlet passageway 127. In particular, decreasing the size of either or both of these components may limit the rate at which liquid can be released from the dispenser 100.

In embodiments, one or more features shown in FIG. 6 may be absent. For example, the shape and/or dimensions of the interior volume 121 may vary, such that more or fewer discernable features are visible from the top view. In one embodiment, for instance, the interior volume 121 may be cone-like in shape and defined by a smooth interior surface that decreases in diameter from the top to the bottom of the attachment component 120, culminating at the outlet passageway 127 or a direct opening to the interstitial space 132. According to such an embodiment, the circumferential edge portions protruding into the interior volume of the attachment component 120 may be absent. Other embodiments may include additional components protruding into the interior volume 121, each component further impeding the rapid flow of liquid from the container 110 to the cap 140.

Figure 7:
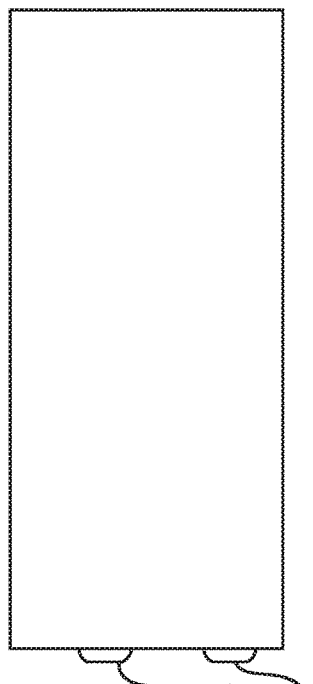
FIG. 7 is a front view of the attachment component, aligned with the top view of the attachment component shown in FIG. 6 in accordance with an embodiment of the present disclosure.

FIG. 7 is a front view of the attachment component 120, aligned with the top view of the attachment component shown in FIG. 6. Two dispense nodules 142 are visible protruding below the bottom surface of the attachment component 120.

Figure 8:
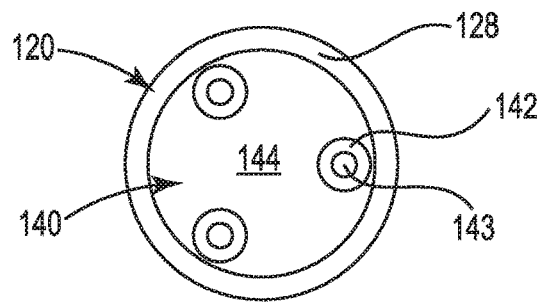
FIG. 8 is a bottom view of a cap, aligned with the front view of the attachment component shown in FIG. 7 in accordance with an embodiment of the present disclosure.

FIG. 8 is a bottom view of the cap 140 inserted in the attachment component 120, aligned with the front view of the attachment component 120 shown in FIG. 7. Three dispense nodules 142 are shown, each including a scent release orifice that marks the external opening to a dispense tube 143. The cap floor 144 is circumferentially surrounded by the attachment component 120, specifically the outer circumferential portion 128.

The number, size and/or arrangement of dispense nodules 142 may vary. For example, the number of dispense nodules may range from 1 to about 20, each nodule defining a dispense tube 143. As shown, the dispense nodules 142 are positioned near the perimeter of the cap floor 144, where they are equally spaced from each other. Equidistant dispense nodules 142 may enable consistent, even dispensing of liquid from the dispenser 100. In embodiments, the dispense nodules 142 may be arranged directly across from each other, or linearly across the diameter of the cap 140. In some examples, the dispense nodules 142 may not be equidistant from each other.

The diameter of each dispense tube 143 may vary. In some embodiments, the diameter of each dispense tube 143 may be sufficiently narrow to cause liquid to be dispensed therefrom in a dropwise fashion. The diameter of each dispense tube 143 may range from about 1 to about 10 mm, about 1.25 to about 5 mm, or about 1.5 to about 2 mm. In additional or alternative embodiments, the dispense tubes 143 may terminate in narrow slits, holes or perforations. Additional components may be added to further control the release of liquid from the dispense tubes 143 and/or close the tubes when liquid is not being emitted therefrom. For instance, the scent release orifice defined by the terminal, exterior end of each dispense tube 143 may be covered by a membrane or bendable plastic that opens when liquid enters the dispense tube and closes when no liquid is in the tube.

In some embodiments, the cap floor 144 may be reversibly covered for leak free packaging, distribution, storage, etc. In some examples, each dispense tube 143 may be sealed with a plastic film at the scent release orifice. In additional embodiments, a hinged lid may be secured to the cap 140. In a closed position, the lid may cover the dispense nodules 142 and prevent liquid from escaping therefrom. In an open position, the lid may expose the dispense nodules 142 to allow liquid to drip therefrom. Embodiments may include other cover means, for example, the cap 140 may include, but is not limited to, closing means comprising a pop-up nozzle, a twist top or nozzle, a slide cover, etc.

Figure 9:
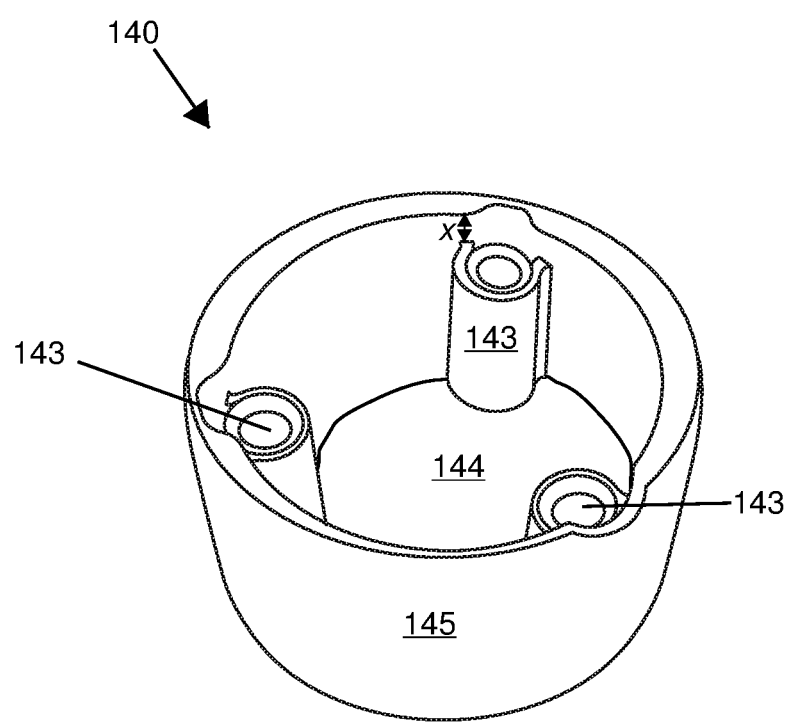
FIG. 9 is a perspective view of the cap of FIG. 8 in accordance with an embodiment of the present disclosure.

FIG. 9 is a perspective view of the cap 140. As shown, the cap 140 may define the cap floor 144 and the circumferential wall 145. Three dispense tubes 143 are also defined by the cap 140 in this embodiment. The difference in height between the circumferential wall 145 and each dispense tube is again marked with an x. When inserted into the cap receiving space 131 defined by the attachment component 120, the dispense nodules 143 may slide between the outer circumferential portion 128 and an inner circumferential portion 129. In some examples, a liquid attractant is not dispensed from the dispenser 100 until the attractant rises above the top of at least one dispense tube 143.

Figure 10:
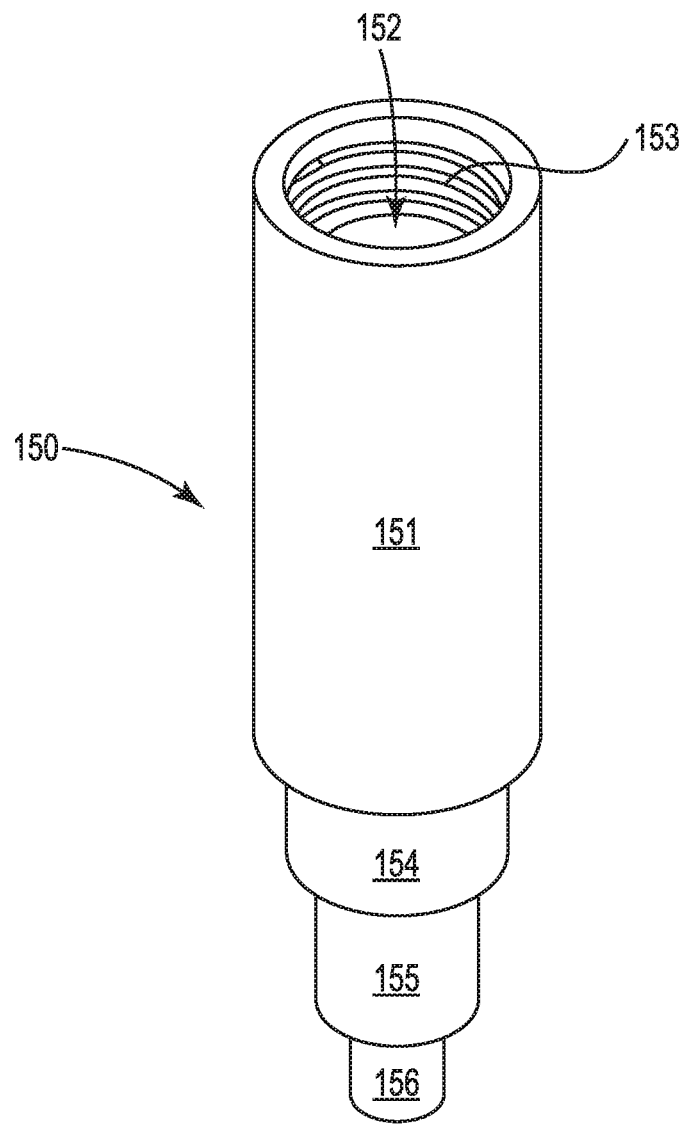
FIG. 10 is a perspective view of a telescoping attachment component in accordance with an embodiment of the present disclosure.

FIG. 10 is a perspective view of a telescoping attachment component 150. This particular telescoping attachment component 150 includes a primary compartment 151 and three slidable compartments 154, 155, 156, each slidable compartment configured to slide into the compartment located above it. At the bottom of the attachment component 150, a cap receiving component 156 may be configured to receive a cap, such as cap 140. The primary compartment 151 may define an interior volume 152 and threads 153 for coupling with a container, such as container 110.

By extending or retracting the slidable compartments 154, 155, 156, the interior volume 152 of the telescoping attachment component 150 may be modified. In particular, each slidable compartment 154, 155, 156 may define an interior portion fluidly coupled with the interior volume 152 of the primary compartment 151. When each slidable compartment 154, 155, 156 is fully extended, the interior volume of the attachment component 150 is maximized. Likewise, when each slidable compartment 154, 155, 156 is fully retracted, the interior volume of the attachment component 150 is minimized. Accordingly, extending the slidable compartments 154, 155, 156 may be appropriate if a greater rate and/or amount of liquid is desired to be released. In some examples, the attachment component 150 may include one or more locking mechanisms such that one or more slidable compartments 154, 155, 156 may be reversibly locked in an extended or retracted position. Implementations may also include a spring-release mechanism for extending the slidable compartments 154, 155, 156 at the push of a button, for example. As noted above, the larger the interior volume in the attachment, the more air that flows into the container, and the more rapidly the scent will be dispensed. Thus, this embodiment allows a user to increase (by expanding the telescoping attachment component 150) or decrease (by collapsing the telescoping attachment component 150) the rate of scent dispensing.

Figure 11:
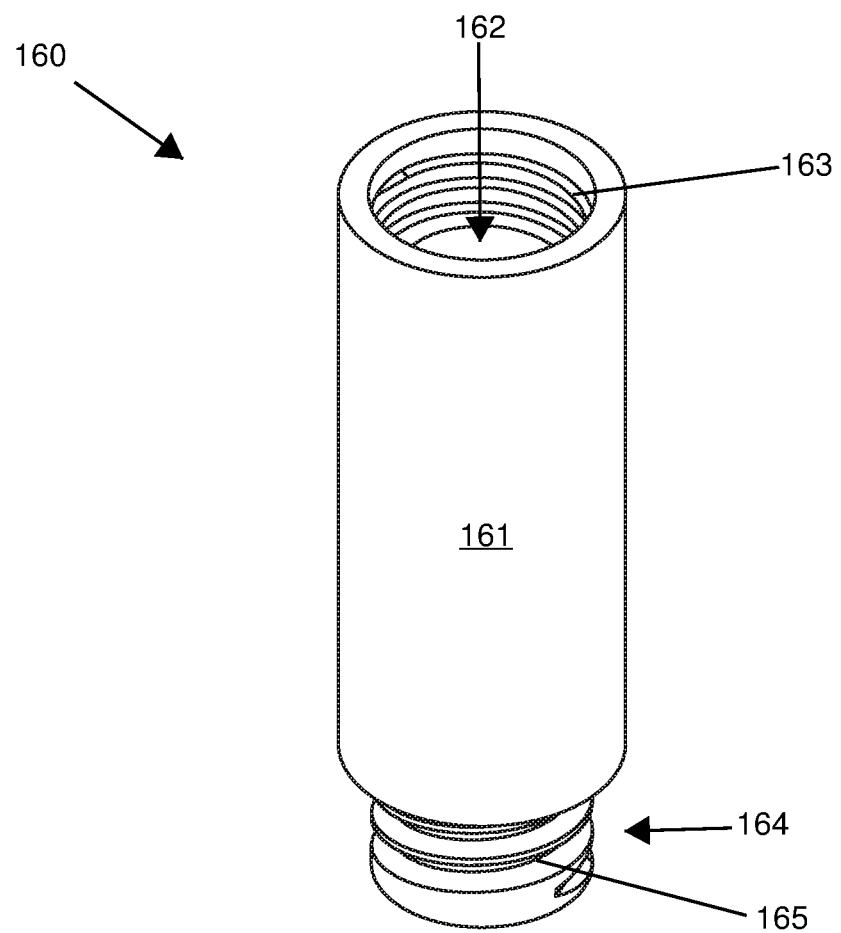
FIG. 11 is a perspective view of another attachment component in accordance with an embodiment of the present disclosure.

FIG. 11 is a perspective view of an attachment component 160 having two compartments 161, 164 that may be coupled together. Like the attachment component 150 shown in FIG. 10, this attachment component 160 includes a primary compartment 161 that also defines an interior volume 162 and internal threads 163 for coupling with a container, such as container 110. A secondary compartment 164 defines external threads 165. To couple the primary compartment 161 with the secondary compartment 164, the external threads 165 of the secondary compartment may rotatably engage with complementary internal threads defined by the primary compartment 161. In some examples, the distance by which the secondary compartment 164 is inserted into the primary compartment 161 may be adjusted by rotating the secondary compartment 164 into and out of the primary compartment 161. According to such examples, the interior air capacity of the attachment component 160 may be adjusted by a user without using additional or alternative compartments. Thus, this embodiment also allows a user to increase (by expanding the lengthening the attachment component 160) or decrease (by shortening the attachment component 160) the rate of scent dispensing.

In some examples, the secondary compartment 164 may be configured to couple with a cap, such as cap 140. In addition or alternatively, the secondary compartment 164 may be configured to couple with another compartment. The number of compartments may vary in various implementations. More or fewer compartments may be coupled to increase or decrease the size of the attachment component 160, thereby modifying the amount of air that may be held within the attachment component. The secondary compartment 164 shown in FIG. 11 defines external threads 165 for coupling, but various coupling means may be used for piecewise assembly of the attachment component 160.

Figure 12:
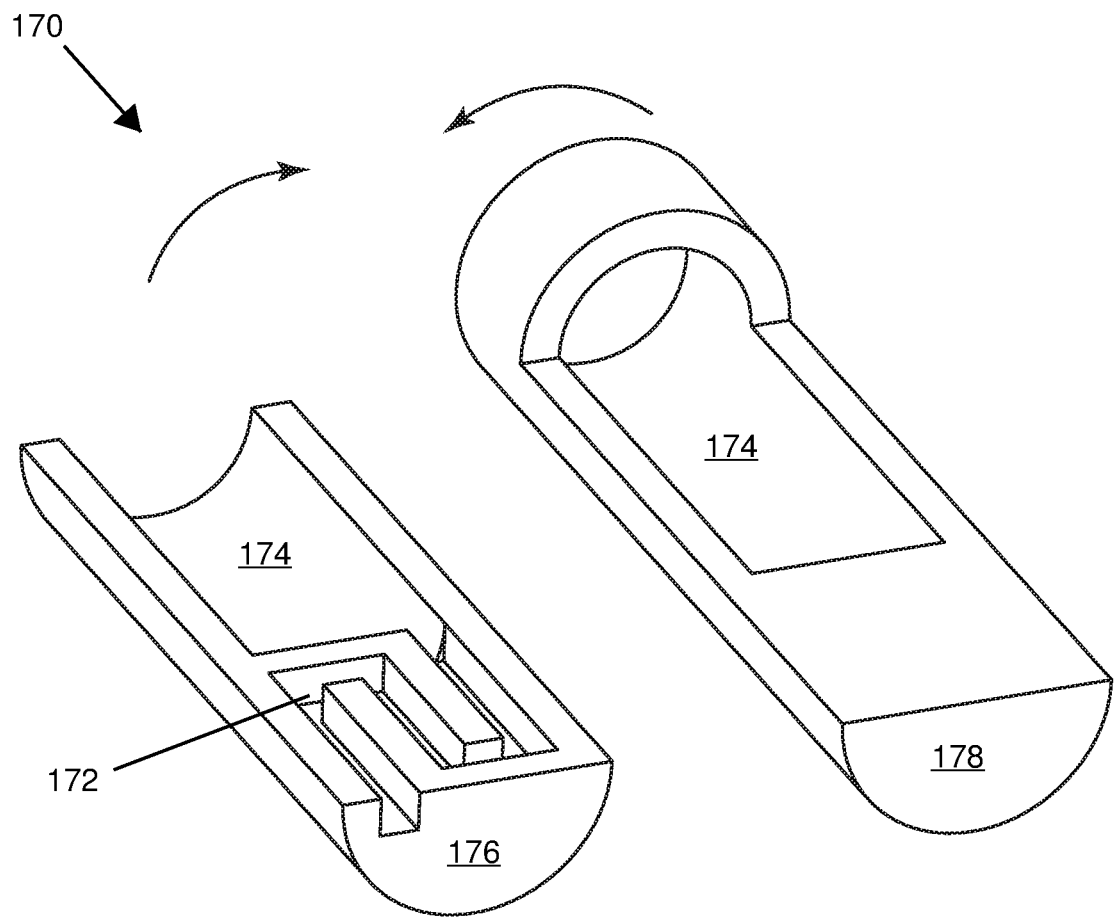
FIG. 12 is a perspective view of an attachment component having a maze-like dispense tube in accordance with an embodiment of the present disclosure.

FIG. 12 is a perspective view of an attachment component 170 defining an interior, maze-like dispense tube 172. The attachment component 170 also defines an interior volume 174 and is depicted as having two halves 176, 178. In embodiments, the attachment component 170 may be formed as one, unitary piece, or as a two-component piece comprising the two halves 176, 178 shown in FIG. 12. In some examples, the two halves 176, 178 may be separable. Disassembly of the attachment component 170 in such examples may facilitate cleaning the interior of the attachment component 170, especially the maze-like dispense tube 172. Due to the configuration of the maze-like dispense tube 172, a dispenser having this particular attachment component 170 may not require a separate cap, such as cap 140. Instead, the winding, circuitous passageway defined by the maze-like dispense tube 172 may control the release of liquid from the attachment component 170 by only allowing the liquid to be released if enough enters the tube 172 such that it rises to a level that is above the uppermost portions of the tube. In all other respects, the attachment component 170 may act similarly to an attachment component coupled with a cap, such as attachment component 120. For instance, the interior volume 174 may serve as the primary air-retention space from which air may displace an amount of liquid within a container coupled with the attachment component 170. In some examples, the attachment component 170 may further define a dispense nodule at the external opening of the dispense tube 172. This embodiment may be made by any desirable method, including molding and combining separate pieces, by three-dimensional printing of the embodiment, etc.

In some examples, the liquid attractants may be provided in their own separate packaging for use as a refill for the dispenser 100. For instance, the liquid attractants may be provided in bottles containing a predetermined volume of liquid attractant, such as 6 ounces, 4 ounces, 2 ounces, or any other suitable volume of liquid attractant. In alternative implementations, the dispenser 100 may be disposable, e.g., single-use, and the liquid attractant may be provided with the dispenser 100 and contained within the container 110.

The liquid scent dispenser may be suspended by the hanging means 113. The liquid scent dispenser may be hung at any suitable location, such as from a tree branch, near a deer stand, etc. In one embodiment, the liquid scent dispenser 100 may be suspended above a natural scrape, for example, a scrape prepared by a white-tail buck. In other embodiments, the liquid scent dispenser 100 may be suspended above an artificial scrape, e.g., a man-made scrape. The liquid scent dispenser 100 may be positioned such that the container 110 is above the dispense nodules 142 relative to the ground or scrape.

Embodiments of the present disclosure can provide for unattended scent release. Scent release may occur under average conditions as experienced in the outdoors, during a period of about 1 to about 20 days, 10 to about 19 days, or any other suitable period of time. In a further embodiment, an animal, e.g., a deer, may be trained to come around during a predetermined time, such as the daytime, of each day, by placing and leaving a liquid scent dispenser 100 in a specified spot for a period of time.

In one embodiment, for operation in the manner so described, small cycles in temperature change that normally occur throughout the day may not trigger scent release from the liquid scent dispenser 100. This situation may be desirable, as such frequent deposition can be unnecessary and wasteful. Additionally, if the temperature during the day does not increase more than 10° F., for example, a minor increase in temperature may often indicate inclement weather, and specifically, the occurrence of rain, during which scent deposition may not be particularly effective.

Various methods of forming the components described herein may be utilized. For example, the attachment component 120 and/or the cap 140 may be formed by a molding process. In some embodiments, the attachment component 120 and/or the cap 140 may be formed by three-dimensional printing and/or sonic welding. Either or both components may be made of one or more polymer compositions, plastics, metals, etc.

Although the present invention has been described with reference to preferred embodiments, persons skilled in the art will recognize that changes may be made in form and detail without departing from the spirit and scope of the invention. For example, a wide variety of modifications to the embodiments of the present disclosure may be made with respect to, for example, container shapes and dimensions, and with respect to the orientation thereof to the ground.

What is claimed is:

1. A temperature-regulated liquid scent dispenser comprising:
    a container defining an interior container volume housing a liquid scent, and a container opening at a first end of the container;
    an attachment component engaged, at a first attachment opening at a first end of the attachment component, with the container opening, the attachment component removable from the container and further defining a second attachment opening at a second end of the attachment component opposite the first end and an interior volume housing an amount of air, wherein the attachment component is configured to receive the liquid scent displaced from the container volume through the first attachment opening upon an expansion of pressure of air within the attachment component caused by an increase in temperature; and
    a cap inserted within a recess defined by the second attachment opening, the cap defining an internal volume configured to receive the liquid scent from the interior volume of the attachment component, the cap defining at least one scent dispense tube, the scent dispense tube in fluid communication with the interior container volume and defining an internal entrance and a scent release orifice, the internal entrance configured to receive liquid scent that overflows from the interior volume defined by the cap, and the scent release orifice configured to dispense the liquid scent from the liquid scent dispenser.

2. The liquid scent dispenser of claim 1, further comprising a cover component enclosing the container.

3. The liquid scent dispenser of claim 2, wherein the cover component further comprises a hanging means.

4. The liquid scent dispenser of claim 3, wherein the hanging means comprises an aperture configured to receive an object.

5. The liquid scent dispenser of claim 3, wherein the hanging means comprises a rope.

6. The liquid scent dispenser of claim 1, wherein the liquid scent comprises one or more scents that may precipitate a territorial or mating attraction of deer before, during or after rut.

7. The liquid scent dispenser of claim 1, wherein the at least one scent dispense tube is vertically oriented.

8. The liquid scent dispenser of claim 1, wherein the interior volume defined by the cap comprises an interstitial space between the cap and the attachment component, such that when the liquid scent fills the interstitial space, the liquid scent overflows into the internal entrance of the at least one scent dispense tube.

9. The liquid scent dispenser of claim 1, wherein the least one scent dispense tube comprises a plurality of scent dispense tubes, each having an equal height.

10. The liquid scent dispenser of claim 1, wherein the attachment component further comprises an outlet passageway through which the liquid scent flows before entering the cap.

11. The liquid scent dispenser of claim 1, wherein the attachment component is generally cylindrical.

12. The liquid scent dispenser of claim 1, wherein the attachment component has a height of about 2 to about 3 inches.

13. The liquid scent dispenser of claim 1, wherein the attachment component has a width of about 0.5 to about 1.5 inches.

14. The liquid scent dispenser of claim 1, wherein the interior volume of the attachment component is about 0.5 to about 1.5 in$^3$.

15. A temperature-regulated liquid scent dispenser comprising:
    a liquid scent;
    a container having an interior portion configured to hold the liquid scent;
    a cap defining at least one scent dispense tube, the scent dispense tube in fluid communication with the interior portion and defining an internal entrance and a scent release orifice, the internal entrance configured to receive liquid scent that overflows from an interstitial space defined by an interior cap volume, and the scent release orifice configured to dispense the liquid scent; and
    an attachment component coupled between the container and the cap, the attachment component removable from the container and the cap, wherein the attachment component defines an interior volume configured to hold an amount of air and receive the liquid scent displaced from the interior portion of the container upon an expansion of air pressure within the attachment component caused by an increase in temperature, wherein the attachment component further defines a recess configured to receive the cap at an end of the attachment component opposite the container.

16. The liquid scent dispenser of claim 15, wherein the at least one scent dispense tube is defined by a circumferential wall defining a perimeter of the cap.

17. The liquid scent dispenser of claim 15, wherein the at least one scent dispense tube comprises a plurality of scent dispense tubes, each tube comprising an equal height.

18. The liquid scent dispenser of claim 15, wherein the container is configured to be completely filled with liquid scent by a user.

19. The liquid scent dispenser of claim 15, wherein the attachment component comprises a cylindrical tube having a height of about 2 to about 3 inches and a diameter of about 0.5 to about 1.5 inches.

* * * * *